April 21, 1959
D. SAYRE
2,883,655
OPTICAL COMPUTER
Filed April 12, 1946
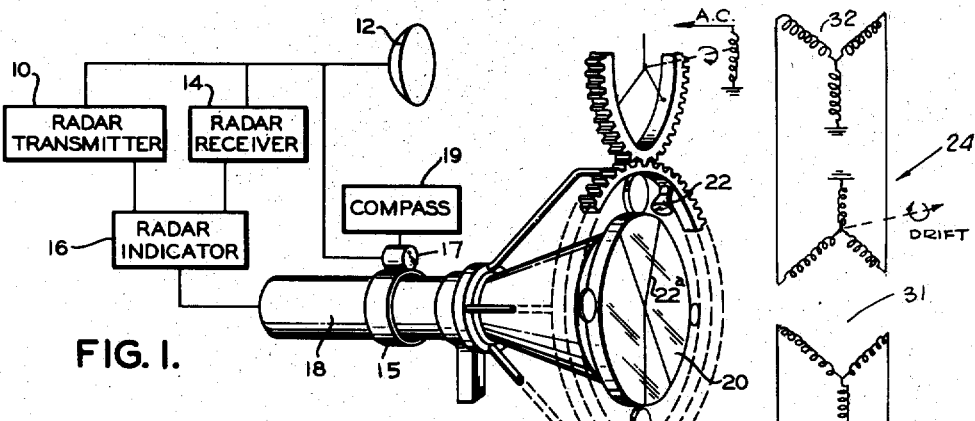
FIG. 1.
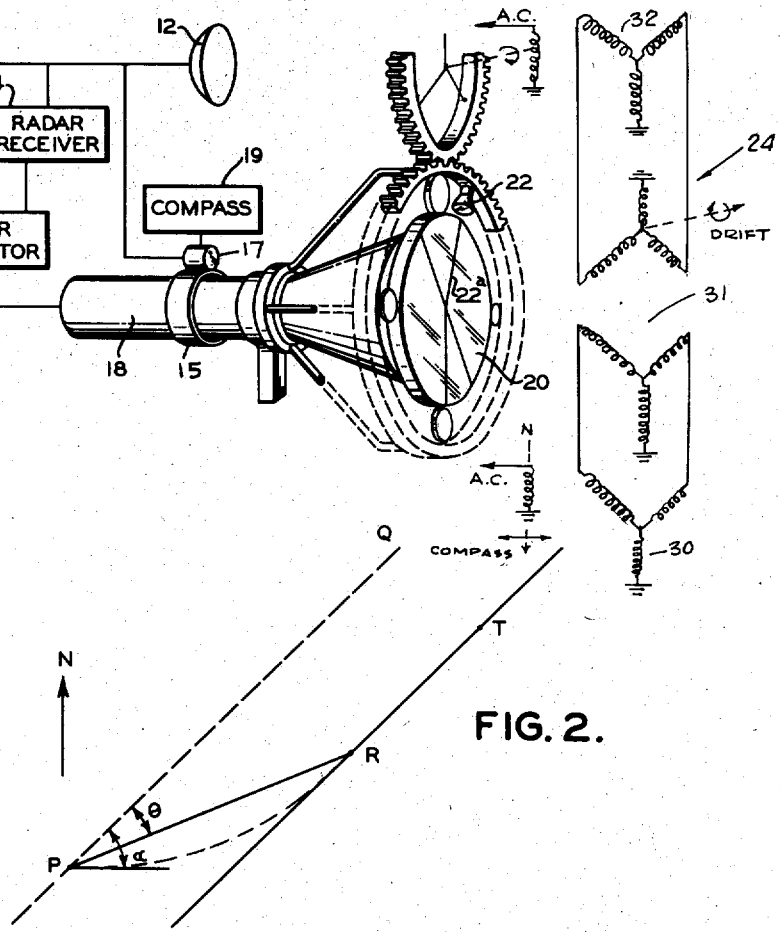
FIG. 2.
FIG. 3.
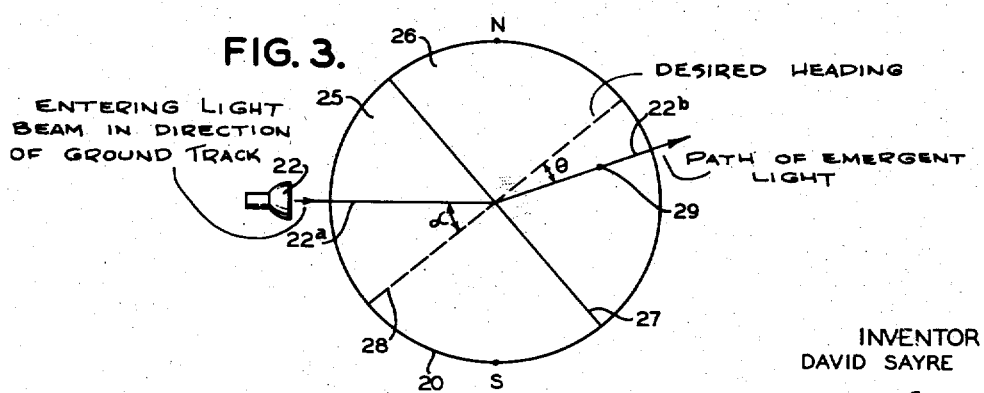
INVENTOR
DAVID SAYRE
BY *M. O. Hayes*
ATTORNEY United States Patent Office 2,883,655
Patented Apr. 21, 1959

2,883,655
OPTICAL COMPUTER

David Sayre, Philadelphia, Pa., assignor, by mesne assignments, to the United States of America as represented by the Secretary of the Navy Application April 12, 1946, Serial No. 661,901

8 Claims. (Cl. 343—7)

This invention relates to range offset steering and bombing systems for aircraft and more particularly to such systems incorporating an optical computer for aid in bringing the aircraft to the desired course rapidly and smoothly. Such range offset steering systems are adaptable for use on other craft, for example ships, which may maneuver freely on the earth's surface but since such systems find primary application in the steering of aircraft this embodiment will be explained in detail. By "range offset steering" herein is meant the art of bringing an aircraft quickly and smoothly from a point outside a given predetermined line to the line, said line being defined on the ground by a target point and by a reference point which may be detected from the aircraft. The direction of the line is known in advance of the operation.

The operation of such range offset steering devices as disclosed in the patent application of David Gale, entitled Computer, Serial Number 661,021, filed April 10, 1946, now U.S. Patent No. 2,743,436 of April 24, 1956, requires the attention of both a pilot and a radar operator. The radar operator observes a plan position indicator and tracks a reference point in bearing in order to transmit information to the pilot's direction indicator. This enables the pilot to follow a required bombing course so as to fly over the aforementioned reference point and the target. The present invention enables a single person to direct the aircraft in such a manner as to accomplish this result.

An object of this invention is to provide a range offset steering device with an optical unit incorporated therein in order to enable one man to operate said device.

A further object of this invention is to provide a range offset steering device with an optical unit incorporated therein in order to solve automatically an equation upon which depends the operation of said device.

A still further object of this invention is to provide an optical system for use in connection with the plan position indicator scope of a range offset steering device, said optical system solving an equation upon which depends the operation of such a system and comprising a glass disc formed of two semi-circular segments of different index of refraction radially illuminated with a beam of light, and means for varying the position of said light beam about the circumference of said glass plate in response to variation of the ground track of the craft upon which the device is mounted.

Other objects and advantages of this invention will be apparent from the accompanying claims and description taken in connection with the drawings in which:

Fig. 1 is a block diagram indicating assembly and combination of the units constituting the system presented herein:

Fig. 2 is a diagram illustrating the problem to be solved by the range offset steering devices herein referred to; and Fig. 3 is a schematic illustration of the principle involved in the optical device incorporated in this invention.

Referring to Fig. 1 there is shown a typical aircraft radar system comprising a transmitter 10, a spinner 12, a receiver 14 and an indicator 16. The outputs of circuits within indicator 16 are presented on a plan position indicator scope 18, hereinafter referred to as a P.P.I. scope. P.P.I. scope 18 is north-stabilized by a compass 19 which is coupled to the deflection yoke 15 of indicator scope 18 through the antenna position repeater 17. Mounted in front of P.P.I. scope 18 and rotatable with respect thereto about the longitudinal axis of the scope is a circular transparent composite plate 20, shown in detail in Fig. 3 and described subsequently. A light source 22 directs a well-defined beam 22a radially into the edge of plate 20, source 22 being mounted in such manner as to permit it to travel about the circumference of plate 20. The direction in which beam 22a from source 22 enters plate 20 is made to coincide with the actual ground track of the aircraft. In an aircraft this may be done by means of a ground track system 24. System 24 may operate on the Sherr or Doppler principle as utilized in co-pending patent applications. An illustration of such is found in patent application Serial No. 651,925, filed March 4, 1946, of William J. Tull entitled "Electrical Apparatus," now U.S. Patent No. 2,859,436, issued November 4, 1958. The Doppler principle involved therein is long known in physics but only recently applied to microwave electromagnetic energy. Briefly stated, the Doppler principle as utilized in ground track systems is that the radar echoes received from stationary objects on the earth's surface by a radar receiver located in a moving craft undergo an apparent frequency shift, the magnitude of which is proportional to the velocity of the craft with respect to these objects as measured along a radial line connecting the craft and the object. It will be apparent that this radio velocity will be a maximum when the radar beam is pointed along the ground track of the aircraft and will be substantially zero when this beam is positioned at right angles to the ground track. From this it can be seen that the ground track of an aircraft, for example, can be readily determined by means of a radar set which detects the above frequency shift and determines the direction at which this frequency shift has a maximum value. This Doppler frequency shift of radar echoes may also be used to measure the drift angle of the aircraft. The Sherr effect is the modulation applied to a reflected radar beam because of the fact that, within the target area receiving and reflecting energy, various increments of area possess varying velocities relative to the aircraft mounting the radar gear. In either case the ground track system output, which may be either electrical or mechanical, varies in response to the actual track of the aircraft. Account thus is taken of drift from aircraft heading.

If the range offset steering mechanism is located in a ship rather than an aircraft, the ground track data may be supplied from the dead reckoning system of the ship.

Referring to Fig. 2 there is shown a point P representing an instantaneous position of the bombing aircraft. A reference point R and a target T determine a desired course R—T. A line P—Q is drawn through P paralleling R—T. The line P—R makes an angle $\theta$ with P—Q. Making an angle $\alpha$ with P—Q is a line representing the instantaneous course of the aircraft. For illustration, the orientation of the whole with respect to North is as shown in Fig. 2.

Referring to Fig. 3 there are shown details of circular glass plate 20 which comprises two semicircular segments 25 and 26 joined along a diameter 27. Installed, plate 20 is rotatably mounted over the screen of P.P.I. scope 18 and concentric therewith. Segments 25 and 26 have indices of refraction $r_{25}$ and $r_{26}$, respectively, such that $r_{26}=kr_{25}$. The value of $k$ will be discussed subsequently in the description of operation. A normal 28 to diameter 27 passes through the center of plate 20. Figs. 2 and 3 are shown in proper orientation; that is, a radar echo 29 appearing in Fig. 3, indicating range and bearing of reference point R, cooperates with the center of circular plate 20 to determine a line in Fig. 3 parallel to the actual corresponding bearing line P—R in Fig. 2. As previously stated, plate 20 is rotatably mounted in front of and concentrically with P.P.I. scope 18. Assume that plate 20 is rotated to such position that normal 28 to diameter 27 lies parallel to line R—T of Fig. 2. A well-defined entering beam of light 22a is directed radially into the edge of plate 20 in such manner as to parallel the line (in Fig. 1) which represents instantaneous course of the aircraft. An emerging beam of light 22b travels radially outward from the center in such manner as to parallel the line P—R of Fig. 2. Any well known means, such as a frosted surface or coated surface, may be used to render the beams visible from the plate. From geometry it is apparent that aforesaid two beams of light will form, respectively, angles $\alpha$ and $\theta$, as defined above, with normal 28 to diameter 27.

In operation, the aircraft is directed from point P to the course R—T by maintaining at all times the relation $\sin \theta = k \sin \alpha$. Within desirable predetermined limits $k$ may have any value and operate successfully. If, however, $k$ be kept relatively small the aircraft will come to the proper course sooner than if $k$ be large. In constructing plate 20, therefore, some value of $k$ approximating ¼ is deemed satisfactory. In other words $r_{25} \approx \frac{1}{4} r_{26}$, in which, as indicated previously, $r_{25}$ denotes the index of refraction of segment 25, and $r_{26}$, that of segment 26.

In operation the aircraft is brought by means other than those described herein to the point P which can be any point from which reference point R can be detected on the P.P.I. scope. At point P the echo from reference point R is detected and ensuing operations are based on the invention described herein. Plate 20 is so rotated with respect to P.P.I. scope 18 that normal 28 to diameter 27 assumes the bearing, as observed on the P.P.I. azimuth scale, of desired course R—T. The well-defined beam of light 22a is directed radially into the edge of plate 20. The direction of said beam entering is adjustably and automatically controlled from ground track system 24 in such manner that beam 22a enters plate 20 at all times on the bearing of the aircraft's ground track. If the plane be directed in such manner that radar echo 29 of reference point R remains always directly under emerging beam 22b, the relation $$\sin \theta = k \sin \alpha$$

will always be maintained. The aircraft consequently will come quickly and smoothly to the line R—T along a path that is neither tractrix nor exponential, but which roughly resembles both. During this approach both angle $\theta$ and angle $\alpha$ will approach zero while maintaining their sine ratio of $k$, and they will reach zero simultaneously as the aircraft assumes its desired course R—T to travel over reference point R and target T.

Control over the orientation of lamp 22 about the circumference of plate 20 may be brought electrically from group track system by means of an electrical remote-control system. Such a system assumes a rotor cooperating with lamp 22 to position the lamp, said rotor being responsive in angular orientation to the actual ground track of the aircraft. As shown in the above application of David Gale, the plane ground track is obtained by means of a selsyn generator 30 whose rotor is excited by a constant value A.C. voltage and mechanically positioned by the output shaft of a conventional compass follow-up unit so that the magnitude of the stator voltage is proportional to the heading of the plane with respect to north. To compensate for the drift, a differential selsyn generator 31 is connected in series with the aforementioned selsyn generator and its rotor is mechanically positioned by the drift angle shaft of a drift angle computer. A selsyn motor 32 whose rotor is adapted to drive the gear arrangement for positioning lamp 22 at various points around the circumference of the composite plate 20 has its stator interconnected to this rotor. The rotor of the selsyn motor 32 thus assumes a position in accordance with the algebraic sum of the positions of the rotors of the selsyn generator 30 and the differential selsyn generator 31, which position represents the ground track direction of the plane. Other means such as direct mechanical drive from ground track system 24 to lamp 22 may be utilized without departing from the principles involved herein.

What is claimed is:

1. For use in combination with an aircraft plan position indicator radar system and a ground track system, an optical system mounted over the scope screen of said radar system for use in range offset steering, said optical system comprising a circular transparent plate formed of two semicircular segments having different indices of refraction joined along a diameter, a light shining radially into the edge of said plate, and means for varying the direction in which said light enters said plate in accordance with the ground track said aircraft makes with respect to a reference direction.

2. For use in combination with an aircraft plan position indicator radar system and a ground track system, an optical system mounted over the scope screen of said radar system for use in range offset steering, said optical system comprising a circular transparent plate formed of two semicircular segments having different indices of refraction joined along a diameter, a light movably mounted in such manner as to shine radially into the edge of said plate while revolving about the circumference of said plate, and means for varying the orientation of said light with respect to said plate in accordance with the ground track said aircraft makes with respect to a reference direction.

3. For use in combination with an aircraft plan position indicator radar system and a ground track system, an optical system mounted over the scope screen of said radar system for solving the equation $\sin \theta = k \sin \alpha$ used in range offset steering where $k$ is a constant, $\theta$ is the angle between a desired course direction and the direction from the present position of the aircraft to a reference point on said desired course and $\alpha$ is the angle between said desired course and the instantaneous ground track of said aircraft, said optical system comprising a circular transparent plate formed of two semicircular segments having different indices of refraction joined along a diameter, a light movably mounted in such manner as to shine radially into the edge of said plate while revolving about the circumference of said plate, and an electrical remote-control system whereby the direction at which said light enters said edge of said plate is made to coincide always with the direction said aircraft travels with respect to a reference direction.

4. Apparatus for presenting a visual solution to the equation $\theta = \arcsin(k \sin \alpha)$ where $k$ is a constant having a value not greater than unity, $\alpha$ is an independently variable angle, and $\theta$ is an angle expressed in units consistent with angle $\alpha$, said apparatus comprising a circular transparent plate formed of two semicircular segments having different indices of refraction joined along a diameter, means for projecting an incident beam of light radially into the edge of said plate, means for moving said light projecting means about the circumference of said plate so that said light is so positioned that the angle between a normal to said diameter and said incident beam is equal to the angle $\alpha$, the angle between said normal and said beam after undergoing refraction at said diameter being equal to the angle $\theta$ and means rendering the path of said light visible to indicate said angles.

5. Apparatus for presenting a visual solution to the equation $\theta = \arcsin(k \sin \alpha)$ where $k$ is a constant having a value not greater than unity, $\alpha$ is an independently variable angle and $\theta$ is an angle expressed in units consistent with angle $\alpha$, said apparatus comprising, a circular transparent plate formed of two semicircular segments having different indices of refraction joined along a diameter, the ratio of said indices of refraction having a value substantially equal to the value of said constant $k$, means for projecting an incident beam of light radially into the edge of said plate, means for moving said light projecting means about the circumference of said plate and for positioning said light projecting means such that said incident beam is at said angle $\alpha$ with respect to a line normal to said diameter, said incident beam after refraction at said diameter being disposed at said angle $\theta$ with respect to said line normal to said diameter and means rendering the path of said light visible to indicate said angles.

6. Apparatus for directing a craft onto a preselected course passing through an identifiable reference point, said apparatus comprising means establishing a maplike plot of the area of the earth's surface including the instantaneous position of said craft and said reference point, an optical system comprising a circular transparent plate formed of two semicircular segments having different indices of refraction joined along a first diameter, means for projecting an incident beam of light radially into the edge of said plate, means for moving said light projecting means about the circumference of said plate, means maintaining the center of said first diameter in coincidence with the instantaneous position of said craft on said maplike plot, means maintaining a second diameter of said plate which is perpendicular to said first diameter parallel to the direction of said preselected course on said maplike plot, means for continuously positioning said light projection means so that the direction of the incident light beam therefrom is parallel to the direction on said maplike plot of the instantaneous ground track of said craft whereby said craft may be directed onto said preselected course by steering said craft to cause said incident beam of light after refraction at said junction of said two segments to pass through the representation of said reference point on said maplike plot.

7. Apparatus for directing a craft onto a preselected course passing through an identifiable reference point, said appaartus comprising means for continuously presenting a maplike plot of the area of the earth's surface including the instantaneous position of said craft and said reference point, the instantaneous position of said craft being located at a fixed point on said maplike plot, an optical system comprising a circular transparent plate formed of two semicircular segments having different indices of refraction joined along a first diameter, said plate being disposed parallel to said maplike plot with the center of said plate coincident with the representation of the instantaneous position of said craft, means maintaining a second diameter of said plate which is perpendicular to said first diameter parallel to the direction of said preselected course on said maplike plot, means for projecting an incident beam of light radially into the edge of said plate, means for moving said light projecting means about the circumference of said plate, means for continuously positioning said light projection means so that the direction of the light beam therefrom is parallel to the direction on said maplike plot of the instantaneous ground track of said craft whereby said craft may be directed onto said preselected course by steering said craft to cause said incident beam of light after refraction at said junction of said two segments to pass through the representation of said reference point on said maplike plot.

8. Apparatus for directing a craft onto a preselected course passing through an identifiable reference point, said apparatus comprising a plan position indicator radar system including a cathode ray tube indicator on which may be displayed a maplike plot of the area of the earth's surface including the instantaneous position of said craft and said reference point, the instantaneous position of said craft being located at fixed point on the screen of said indicator, an optical system comprising a circular transparent plate formed of two semicircular segments having different indices of refraction joined along a first diameter, said plate being disposed parallel to said screen of said indicator with the center of said plate disposed over the representation of the instantaneous position of said craft, means maintaining a second diameter of said plate which is perpendicular to said first diameter parallel to the direction of said preselected course on said maplike plot, means for projecting an incident beam of light radially into the edge of said plate, means for moving said light projecting means about the circumference of said plate, means for continuously positioning said light projection means so that the direction of the light beam therefrom is parallel to the direction on said maplike plot of the instantaneous ground track of said craft whereby said craft may be directed onto said preselected course by steering said craft to cause said incident beam of light after refraction at said junction of said two segments to pass through the representation of said reference point on said maplike plot.

References Cited in the file of this patent
UNITED STATES PATENTS
2,213,307     Elliott _____ Sept. 3, 1940
FOREIGN PATENTS
410,060     Great Britain _____ May 10, 1934
OTHER REFERENCES
Central Scientific Co., Catalogue (J–141), 1941, page 1421.